(No Model.)

T. FRY.
CLOTHES DRIER.

No. 495,409. Patented Apr. 11, 1893.

WITNESSES:
F. McArdle
C. Sedgwick

INVENTOR:
T. Fry
BY Munn & Co
ATTORNEYS.

UNITED STATES PATENT OFFICE.

THOMAS FRY, OF CALGARY, CANADA.

CLOTHES-DRIER.

SPECIFICATION forming part of Letters Patent No. 495,409, dated April 11, 1893.

Application filed April 15, 1892. Serial No. 429,302. (No model.)

*To all whom it may concern:*

Be it known that I, THOMAS FRY, of Calgary, in the District of Alberta and Dominion of Canada, have invented a new and useful Improvement in Clothes Horses or Racks, of which the following is a full, clear, and exact description.

My invention relates to an improvement in clothes horses or racks, and has for its object to provide a suspensory device adapted for ready attachment to or detachment from a socket secured to the ceiling or other overhead support.

A further object of the invention is to construct the device in a simple, durable and economic manner, and to provide a means whereby the rack or horse may be lengthened or shortened as occasion may demand, and whereby it may be revolved in its socket whenever desired, and further whereby the arms adapted to receive the clothes or other articles to be carried by the horse or rack may be readily and expeditiously disconnected from the body of the rack or horse, thus enabling the device when not in use to be compactly folded and placed in a small compass.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
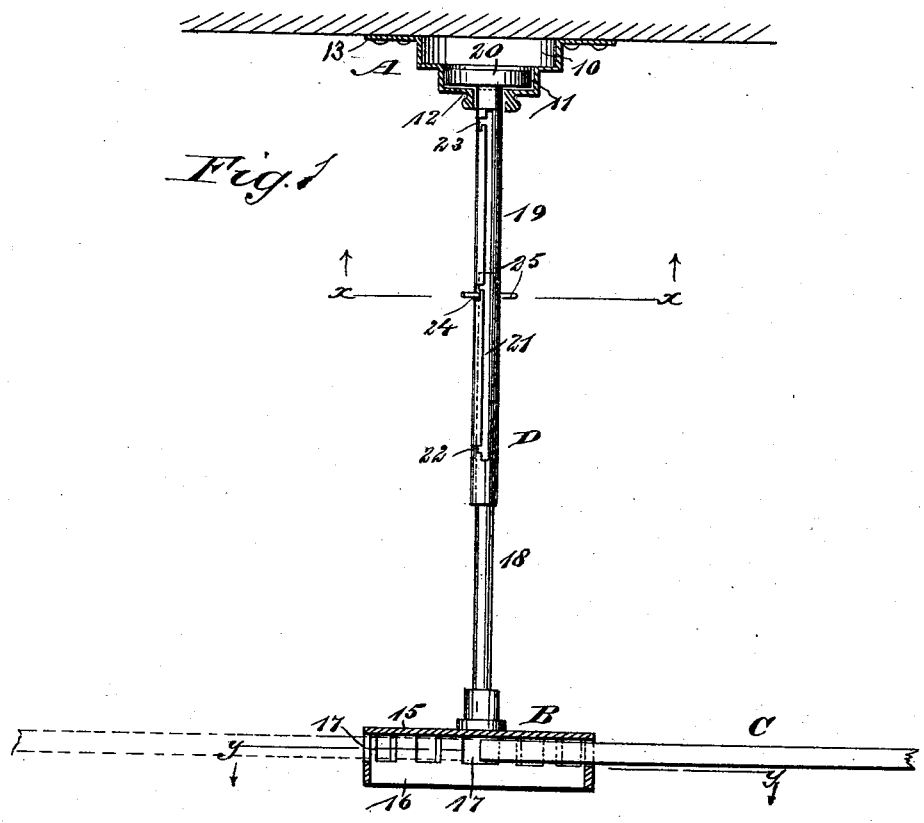
Figure 2:
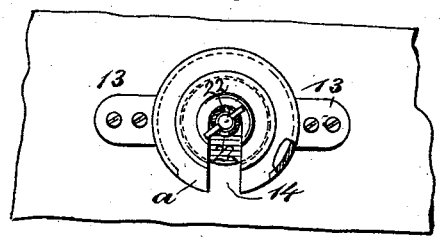
Figure 3:
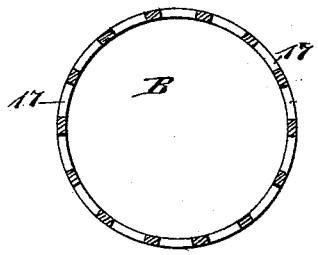

Figure 1 is a partial side elevation and a partial vertical section through the device, the socket supporting device being also in vertical section. Fig. 2 is a horizontal section taken practically on the line $x$—$x$ of Fig. 1; and Fig. 3 is a horizontal section taken through the arm support or body section of the rack or horse, practically on the line $y$—$y$ of Fig. 1.

In carrying out the invention a socket A, is adapted to be attached to the ceiling or other overhead support. This socket is preferably made in three diameters, including an upper section 10, an intermediate section 11 in direct communication with the upper section and of less diameter than the latter, and a lower section 12 of a still smaller diameter, which section is shaped more or less as a collar, being open at top and bottom. The upper section 10 is provided with flanges 13, whereby it is secured to the ceiling or other support, and the socket A, is provided in one side with an opening 14, extending diametrically through to the center, the opening being of the same size throughout except at the extreme upper end where it is much wider than at any other point, and width of this portion of the opening being shown at $a$ in Fig. 2.

The device itself may be said to consist of a body B, arms C to be carried by the body, and an upper suspension device D, connected with the body. The body section is preferably made circular in general contour, comprising a disk-like plate 15, from the margin of which a flange 16, of any desired depth, is downwardly projected; and in this flange a series of openings 17 is produced, arranged at predetermined intervals apart, the said openings being adapted to receive the arms C, which may be made of wood, metal, or of any desired material, and the arms are passed through the openings 17 until the inner ends of the arms practically reach the central portion of the body, as shown in Fig. 1. These arms are therefore radially arranged, are removable, and are adapted to receive the clothes or other articles to be carried by the horse or rack. It is preferred that these arms should have no direct attachment to the body; but if in practice it is found desirable a set screw or any form of latch may be employed, carried by the body and adapted for engagement with the arms.

The suspension section D of the device is preferably made to consist of a rod 18, secured at its lower end to the upper sectional portion of the body and a tube 19, in which the upper portion of the rod has vertical movement. This tube at its upper end is provided with a cap 20 of sufficient size to enter the socket at the larger portion $a$ of its opening 14, and when entered to fit snugly down into the intermediate section 11, the tube extending downward from the socket through the lower collar section 12 of the latter. By this means the body is suspended from the socket and may be expeditiously and conveniently connected with the socket or removed therefrom.

The tube 19 is adapted to be lengthened and shortened in order that the device may be located a greater or less distance from the floor, and this may be accomplished in the following manner: A vertical slot 21, is produced in opposite sides of the tube, the slots being in diametrical alignment; and at the bottom of each slot a bayonet slot extension 22, is formed, one extension at each side or at the lower end of each of the slots 21, and the extensions 22 project at opposite sides of the tube horizontally but in opposite directions, as shown in Fig. 2. The same bayonet slot extension is repeated at the top of the slots 21, and these upper bayonet slots are designated in the drawings as 23. A third set of these slots is preferably made at or near the center of the vertical slots 21, and are designated in the drawings as 24. In fact, any desired number of these bayonet slot extensions may be used in connection with the main or vertical slots 21.

A pin 25, is passed through the upper end of the rod 18, extending beyond opposite sides of said rod. To make the device as short as possible the rod 18, is slid upward in the tube until the pin 25, is opposite the upper bayonet slot extension, whereupon the rod is given a partial revolution which will admit of the pin dropping in the vertical member of said extension. In like manner the device may be lengthened by causing the pin 25 to enter the slot extensions at the center of the tube, or near its lower end.

Having thus described my invention, I claim as new and desire to secure by Letters Patent—

1. In a clothes horse or rack, the combination, with a socket adapted for attachment to a ceiling or other overhead support, the said socket being provided with an opening in its bottom and in its side, of a horse or rack consisting of a body section comprising a plate and a flange projected downward from the plate and having openings therein, and arms removably introduced into the openings in the flange, a rod connected with the body and extending upwardly therefrom, a tube in which the rod has movement, said tube being provided at its upper end with a head adapted to enter the socket, and a locking connection between the rod and the tube, substantially as set forth.

2. In a clothes horse or clothes rack, the combination, with a socket circular in cross section and constructed in different diameters, the said socket being adapted for attachment to an overhead support and provided with an opening in its bottom and one in its side, of a clothes horse or rack, comprising a body, which body consists of a plate and a flange projected downward from the plate and having openings formed therein, arms removably inserted into the body through its flange openings, a rod connected with the body and extending upwardly therefrom, a tube in which the rod has movement, said tube being provided with a head adapted to enter the socket, the tube being further provided at opposite sides with longitudinally aligning slots, bayonet slot extensions emanating from the longitudinal slot at various points in its length, and a pin carried by the rod and having guided movement in the longitudinal slots and capable of being engaged by the bayonet slot extensions of said longitudinal slots, substantially as shown and described.

THOMAS FRY.

Witnesses:
JOSEPH SMITH,
CHARLES MCMILLAN.